US008923425B2

(12) United States Patent
Tsai et al.

(10) Patent No.: US 8,923,425 B2
(45) Date of Patent: Dec. 30, 2014

(54) COMMUNICATION APPARATUS, COMMUNICATION SYSTEM AND CHANNEL FEEDBACK METHOD THEREOF FOR USE IN MULTI-INPUT MULTI-OUTPUT NETWORK

(75) Inventors: Tsung-Yu Tsai, Tainan County (TW); Chun-Che Chien, Taipei (TW)

(73) Assignee: Institute For Information Industry, Taipei (TW)

( * ) Notice: Subject to any disclaimer, the term of this patent is extended or adjusted under 35 U.S.C. 154(b) by 605 days.

(21) Appl. No.: 13/178,772

(22) Filed: Jul. 8, 2011

(65) Prior Publication Data
US 2012/0008703 A1     Jan. 12, 2012

Related U.S. Application Data

(60) Provisional application No. 61/362,702, filed on Jul. 9, 2010, provisional application No. 61/380,712, filed on Sep. 8, 2010.

(51) Int. Cl.
*H04L 1/02*     (2006.01)
*H04B 7/06*     (2006.01)

(52) U.S. Cl.
CPC .................................... *H04B 7/0626* (2013.01)
USPC ......................................................... 375/267

(58) Field of Classification Search
USPC ............ 375/267, 260, 259; 370/329, 328, 20, 370/252; 455/60
See application file for complete search history.

(56) References Cited

U.S. PATENT DOCUMENTS

| 7,746,943 | B2* | 6/2010 | Yamaura | 375/260 |
|---|---|---|---|---|
| 8,565,179 | B2* | 10/2013 | Noh et al. | 370/329 |
| 2010/0142462 | A1* | 6/2010 | Wang et al. | 370/329 |
| 2010/0226455 | A1* | 9/2010 | Porat et al. | 375/267 |
| 2010/0278278 | A1* | 11/2010 | Lee et al. | 375/267 |
| 2011/0032839 | A1* | 2/2011 | Chen et al. | 370/252 |
| 2011/0243272 | A1* | 10/2011 | Hammarwall et al. | 375/296 |
| 2013/0003683 | A1* | 1/2013 | Zhang et al. | 370/329 |

FOREIGN PATENT DOCUMENTS

WO     2006/034577 A1     4/2006

OTHER PUBLICATIONS

Office Action by the Taiwan Intellectual Property Office for Taiwan counterpart application to the present US application, rendered on Aug. 26, 2013, 7 pages.

* cited by examiner

*Primary Examiner* — Shuwang Liu
*Assistant Examiner* — Helene Tayong
(74) *Attorney, Agent, or Firm* — Skaar Ulbrich Macari, P.A.

(57) ABSTRACT

A communication apparatus, a communication system and a channel feedback method thereof for use in multi-input multi-output network are provided. The communication apparatus and the communication system communicate with each other via first antenna and second antenna respectively. The communication apparatus and the communication system transmit sounding signals via two high-related sounding channels and determine phase information of the signal transmitted in the channel between the communication apparatus and the communication system accordingly.

20 Claims, 9 Drawing Sheets

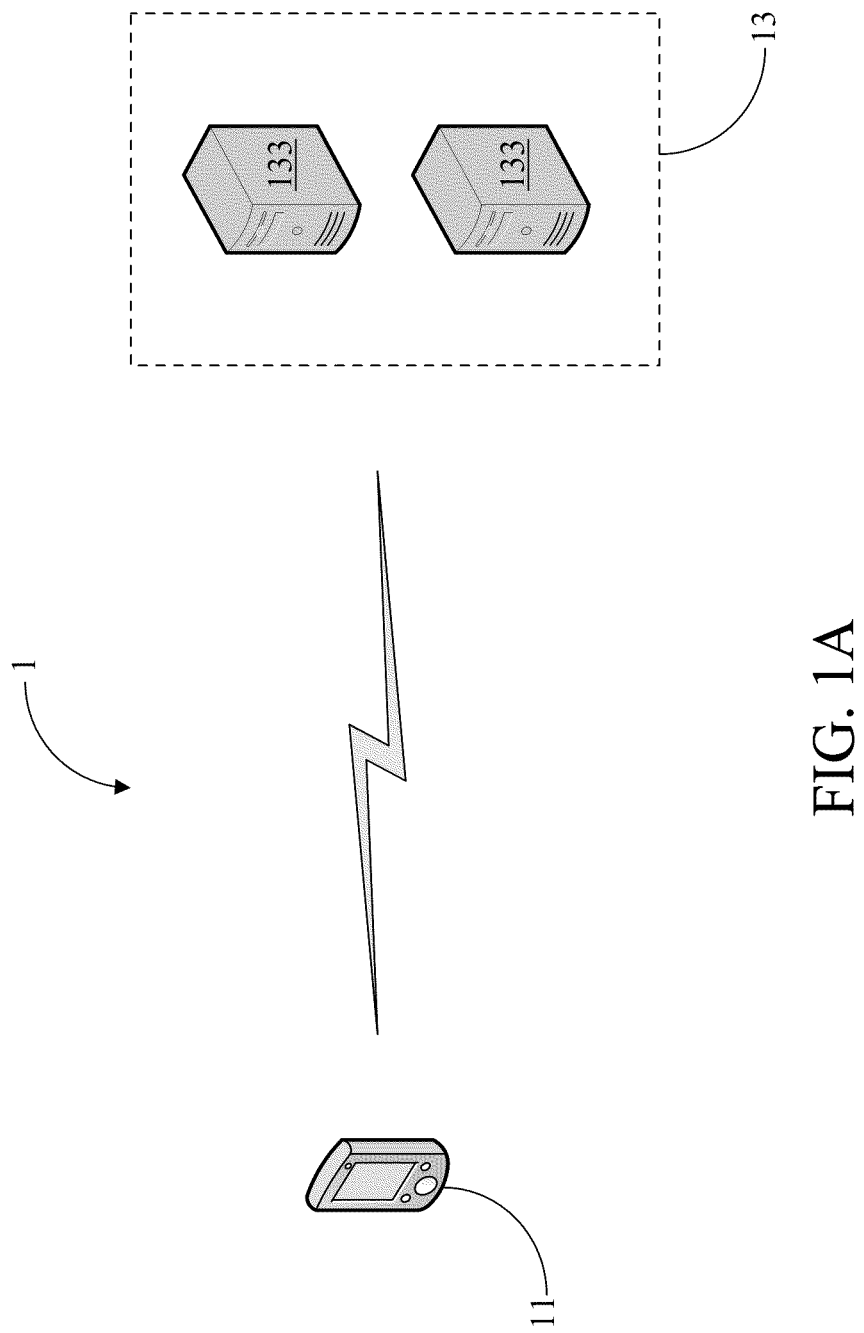

COMMUNICATION APPARATUS, COMMUNICATION SYSTEM AND CHANNEL FEEDBACK METHOD THEREOF FOR USE IN MULTI-INPUT MULTI-OUTPUT NETWORK

PRIORITY

This application claims the benefit of U.S. Provisional Application Ser. No. 61/362,702 filed on Jul. 9, 2010, and U.S. Provisional Application Ser. No. 61/380,712 filed on Sep. 8, 2010, both of which are hereby incorporated by reference herein in their entirety.

FIELD

The present invention relates to a communication apparatus, a communication system and a channel feedback method thereof. More particularly, the present invention relates to a communication apparatus, a communication system and a channel feedback method thereof for use in a multi-input multi-output (MIMO) network.

BACKGROUND

In recent years, as wireless networks play a more and more important role in modern people's life, users' requirements on performance of the wireless networks become increasingly higher. Correspondingly, various technologies for improving the network performance have been developed. Among these technologies, the multi-input multi-output (MIMO) antenna technology is considered as an important technology because of such advantages of extended network communication coverage, improved connection quality, improved spectrum efficiency and a high data rate.

In particular, according to the MIMO antenna technology, multiple sets of antennae are disposed in a communication apparatus and signal transmissions are accomplished through a corresponding protocol. In other words, because the communication apparatus adopting the MIMO antenna technology is provided with multiple sets of hardware antennae, signal transmissions must be coordinated according to configurations of the hardware antennae when the communication apparatus is to transmit signals. In order to make the coordination between signal transmissions more efficient, a channel feedback mechanism is usually established between communication apparatuses operating in a wireless network that adopts the MIMO antenna technology so that the communication apparatuses can transmit information in a more efficient way. In the prior art, the channel feedback mechanism is typically accomplished in two ways, namely, the precoder matrix indicator (PMI) feedback and the sounding-based feedback.

In more detail, the PMI feedback mainly operates in the following way. A plurality of precoder matrices are pre-defined between a communication apparatus at a transmitting end and a communication apparatus at a receiving end. When the communication apparatus at the transmitting end and the communication apparatus at the receiving end are to communicate with each other via a channel, the communication apparatus at the receiving end may choose one of the precoder matrices that is appropriate for transmitting a signal according to channel conditions, and notify the chosen precoder matrix to the communication apparatus at the transmitting end. In this way, the communication apparatus at the receiving end and the communication apparatus at the transmitting end can perform signal transmissions therebetween by use of an identical precoder matrix.

Briefly speaking, the PMI feedback mainly utilizes pre-defined signal transmission configurations to perform signal transmissions. However, because the PMI feedback utilizes the precoder matrices in fixed configurations to perform signal transmissions, it cannot completely adapt to the channel conditions of the communication apparatuses and this leads to serious degradation in performance of the signal transmissions.

On the other hand, the sounding-based feedback mainly operates in the following way. The communication apparatus at the transmitting end transmits a sounding signal to the communication apparatus at the receiving end so that the communication apparatus at the transmitting end can determine uplink (from the receiving end to the transmitting end) channel conditions according to the sounding signal; meanwhile, the communication apparatus at the transmitting end can also estimate downlink (from the transmitting end to the receiving end) channel conditions according to the channel reciprocity. In this way, optimized signal transmissions can be performed by the communication apparatus at the transmitting end.

However, because the sounding-based feedback relies on the channel reciprocity to estimate the downlink channel conditions according to the uplink channel conditions, it is only applicable to environments where a channel reciprocity exists between the uplink channel and the downlink channel (e.g., Time Division Duplex (TDD) systems). Further speaking, because an uplink channel and a downlink channel in a Frequency Division Duplex (FDD) system may be within different frequency bands, a communication apparatus at the transmitting end in the FDD system might fail to estimate the downlink channel conditions according to the uplink channel conditions.

Accordingly, an urgent need exists in the art to provide a solution that can accomplish the channel feedback accurately and effectively in an MIMO network so as to perform signal transmissions in a more efficient way.

SUMMARY

To solve the aforesaid problems associated with the channel feedback, the present invention provides a communication apparatus, a communication system and a channel feedback method thereof. According to certain embodiments of the present invention, sounding signals are transmitted via two sets of highly correlated sounding channels, and phase-related information when a signal is transmitted through a channel between the communication apparatus and the communication system can be determined correspondingly.

To achieve the aforesaid objective, certain embodiments of present invention provide a channel feedback method for use in a communication apparatus. The communication apparatus is used in a multi-input multi-output (MIMO) network comprising at least one communication system. The communication apparatus has a first antenna, and the communication system has a plurality of second antennae. The communication apparatus and the communication system communicate via the first antenna and the second antennae respectively. A plurality of first sounding signals and a plurality of second sounding signals are defined between the communication apparatus and the communication system. The channel feedback method comprises the following steps of: (a) enabling the communication apparatus to receive a plurality of pilot messages from the communication system and determine a plurality of corresponding first channel responses according to the pilot messages; (b) enabling the communication apparatus to determine a plurality of corresponding phases according to the first channel responses; (c) enabling the communication apparatus to append the phases to the first sounding signals respectively and transmit the first sounding signals to the communication system via the first sounding channels; and (d) enabling the communication apparatus to transmit the second sounding signals to the communication system via a plurality of second sounding channels so that the communication system determines a plurality of corresponding second channel responses according to the second sounding signals and calculates the phases according to the first sounding signals and the second channel responses.

To achieve the aforesaid objective, certain embodiments of the present invention also provide a communication apparatus for use in an MIMO network comprising a communication system. A plurality of first sounding signals and a plurality of second sounding signals are defined between the communication apparatus and the communication system. The communication apparatus comprises a first antenna, a transceiver and a processor. The transceiver is configured to communicate with the communication system via the first antenna and a plurality of second antennae of the communication system, and receive a plurality of pilot messages from the communication system. The processor determines a plurality of corresponding first channel responses according to the pilot messages and determines a plurality of corresponding phases according to the first channel responses. The processor is further configured to: append the phases to the first sounding signals respectively, transmit the first sounding signals from the transceiver to the communication system via a plurality of first sounding channels, and transmit the second sounding signals to the communication system via a plurality of second sounding channels so that the communication system determines a plurality of corresponding second channel responses according to the second sounding signals and calculates the phases according to the first sounding signals and the second channel responses.

To achieve the aforesaid objective, certain embodiments of the present invention further provide a channel feedback method for use in a communication system and in an MIMO network comprising a communication apparatus. The communication apparatus has a first antenna, and the communication system has a plurality of second antennae. The communication apparatus and the communication system communicate via the first antenna and the second antennae respectively. A plurality of first sounding signals and a plurality of second sounding signals are defined between the communication apparatus and the communication system. The channel feedback method comprises the following steps of: (a) enabling the communication system to transmit a plurality of pilot messages to the communication apparatus so that the communication apparatus determines a plurality of corresponding first channel responses according to the pilot messages and determines a plurality of corresponding phases according to the first channel responses; (b) enabling the communication system to receive the first sounding signals from the communication apparatus via a plurality of first sounding channels after the communication apparatus has appended the phases to the first sounding signals respectively; (c) enabling the communication system to receive the second sounding signals from the communication apparatus via a plurality of second sounding channels; and (d) enabling the communication system to determine a plurality of corresponding second channel responses according to the second sounding signals and calculate the phases according to the first sounding signals and the second channel responses.

To achieve the aforesaid objective, certain embodiments of the present invention further provide a communication system for use in an MIMO network. The MIMO network comprises a communication apparatus having a first antenna. A plurality of first sounding signals and a plurality of second sounding signals are defined between the communication apparatus and the communication system. The communication system comprises a plurality of second antennae and at least one communication device. The at least one communication device comprises a transceiver and a processor. The transceiver is configured to communicate with the communication apparatus via the second antennae and the first antenna of the communication apparatus, and transmit a plurality of pilot messages to the communication apparatus so that the communication apparatus determines a plurality of corresponding first channel responses according to the pilot messages and determines a plurality of corresponding phases according to the first channel responses. The transceiver is further configured to receive the first sounding signals from the communication apparatus via a plurality of first sounding channels after the communication apparatus has appended the phases to the first sounding signals respectively, and configured to receive the second sounding signals from the communication apparatus via a plurality of second sounding channels. The processor is configured to determine a plurality of corresponding second channel responses according to the second sounding signals and calculate the phases according to the first sounding signals and the second channel responses.

With the technical features disclosed above, the communication apparatus, the communication system and the channel feedback method thereof of the present invention can determine phase information by using two sets of sounding channels in the MIMO network and further use the phase information to improve the efficiency of the channel feedback.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIG. 1A is a schematic view of an MIMO network according to a first embodiment of the present invention;

DETAILED DESCRIPTION

In the following descriptions, the present invention will be explained with reference to example embodiments thereof. However, these example embodiments are not intended to limit the present invention to any specific example. Embodiment, environment, applications or particular implementations described in these example embodiments. Therefore, description of these example embodiments is only for purpose of illustration rather than to limit the present invention. It should be appreciated that, in the following embodiments and the attached drawings, elements unrelated to the present invention are omitted from depiction.

Figure 1B:
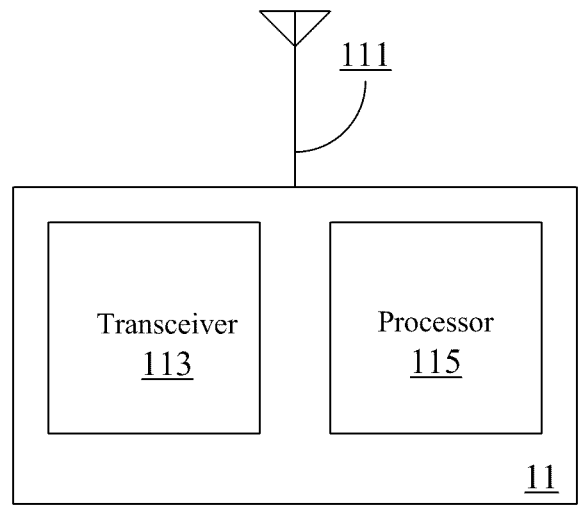
FIG. 1B is a schematic view of a communication apparatus according to the first embodiment of the present invention.
Figure 1C:
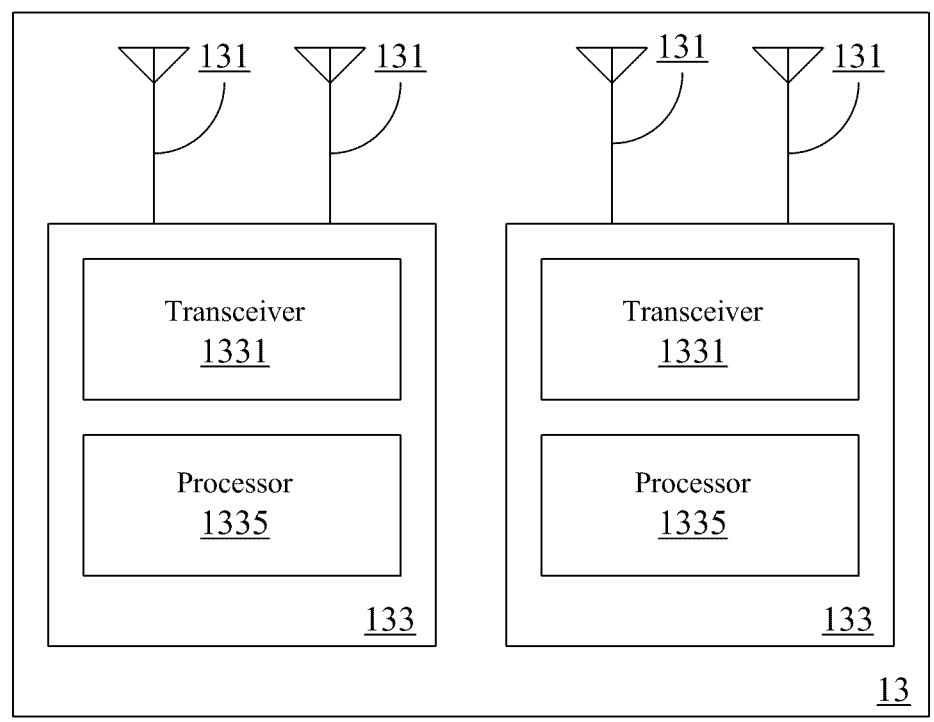
FIG. 1C is a schematic view of a communication system according to the first embodiment of the present invention.

Referring to FIG. 1A to FIG. 1C together, FIG. 1A is a schematic view of a multi-input multi-output (MIMO) network 1 according to a first embodiment of the present invention. The MIMO network 1 comprises a communication apparatus 11 and a communication system 13. FIG. 1B is a schematic view of the communication apparatus 11 according to the first embodiment of the present invention, and FIG. 1C is a schematic view of the communication system 13 according to the first embodiment of the present invention. The communication apparatus 11 comprises a first antenna 111, a transceiver 113 and a processor 115. The communication system 13 comprises a plurality of second antennae 131 and at least one communication device 133. The at least one communication device 133 comprises a transceiver 1331 and a processor 1335. The communication apparatus 11 communicates with the communication system 13 via the transceiver 113 and the first antenna 111. On the other hand, the communication system 13 communicates with the communication apparatus 11 via the transceiver 1331 and the second antennae 131.

It shall be particularly appreciated that, the communication apparatus 11 is a mobile station and the communication system 13 is a base station group in the first embodiment; however, this is only for ease to illustrate the concepts of applying the present invention to an MIMO network but is not intended to limit the hardware implementations of the communication apparatus and the communication system. In other words, both the communication apparatus and the communication system may be a base station in other embodiments. Furthermore, although the communication system 13 comprises four second antennae 131 and two communication devices 133 (i.e., two base stations) in the first embodiment, this is not intended to limit the number of the second antennae and that of the communication devices. Interactions between the communication apparatus 11 and the communication system 13 will be further described hereinafter.

Figure 1D:
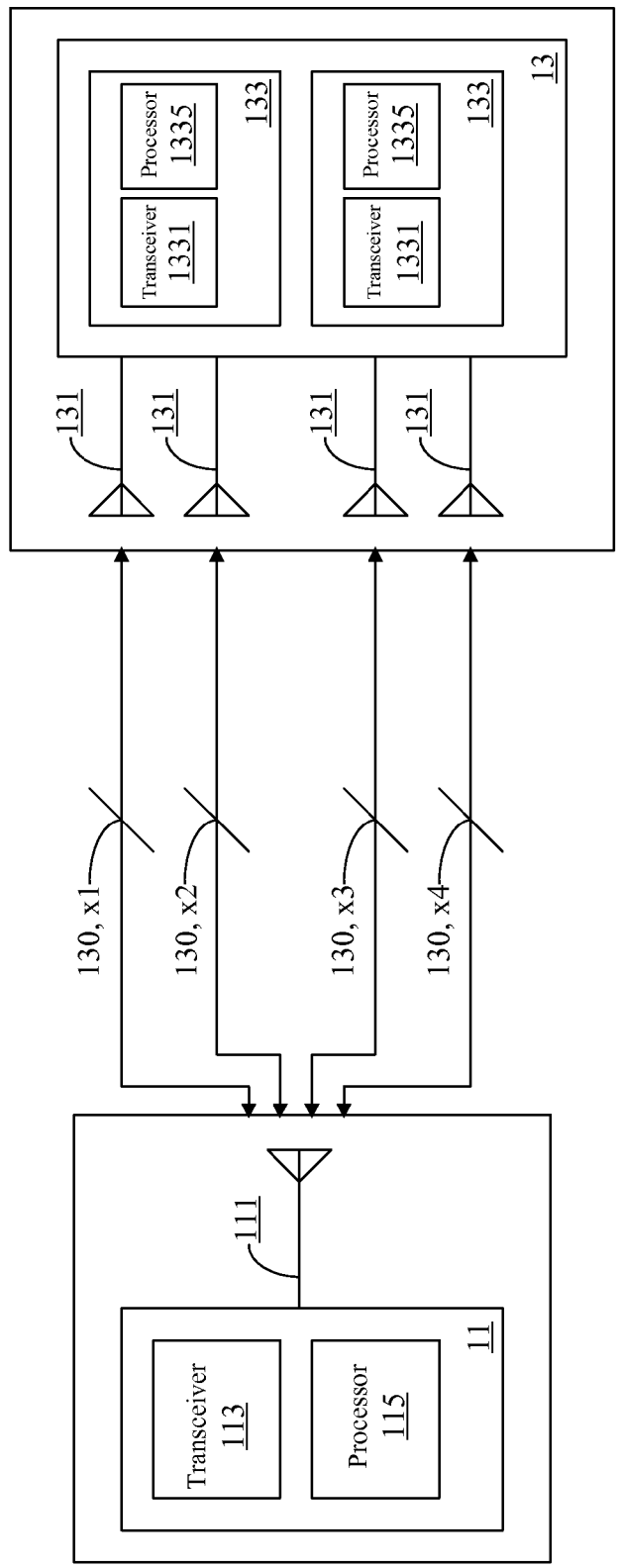
FIG. 1D is a schematic view illustrating signal transmissions between the communication apparatus and the communication system according to the first embodiment of the present invention.

Referring next to FIG. 1D, there is shown a schematic view illustrating signal transmissions between the communication apparatus 11 and the communication system 13 according to the first embodiment of the present invention. First, an initial communication must be performed between the communication apparatus 11 and the communication system 13. In detail, the communication device 133 of the communication system 13 transmits a plurality of pilots messages 130 from the transceiver 1331 to the communication apparatus 11 via the second antennae 131. Then, the pilot messages 130 are received by the transceiver 113 of the communication apparatus 11 via the first antenna 111, and the processor 115 determines a plurality of channel responses x1~x4 of the spatial channels between the communication apparatus 11 and the communication system 13 according to the pilot messages 130.

Further speaking, there are four spatial channels between the first antenna 111 and the second antennae 131 in the first embodiment, so there will be four corresponding channel responses x1~x4. The channel responses x1~x4 may be represented by complex numbers in a manner conventionally used by those skilled in the art. In detail, the channel responses x1~x4 may be represented by $x1=C1\times e^{(j\times\theta 1)}$, $x2=C2\times e^{(j\times\theta 2)}$, $x3=C3\times e^{(j\times\theta 3)}$ and $x4=C4\times e^{(j\times\theta 4)}$ respectively. Here, C1~C4 are functions related with channel characteristics, and θ1~θ4 are phases corresponding to the respective channel responses. It shall be particularly appreciated that, these representations are well known in the prior art, so they will not be further described herein.

In the way described above, the processor 15 of the communication apparatus 11 can further obtain respective phases θ1~θ4 corresponding to the channel responses x1~x4 (not shown). After having calculated the phases θ1~θ4 corresponding to the spatial channels between the communication apparatus 11 and the communication system 13 according to the channel responses x1~x4, the communication apparatus 11 can transmit sounding signals by a plurality of first sounding signals a1~a4 and a plurality of sounding signals b1~b4 predefined between the communication apparatus 11 and the communication system 13 via two sets of sounding channels so that correct phase information of the spatial channels can also be obtained by the communication system 13.

It shall be particularly appreciated that, the first sounding signals a1~a4 and the second sounding signals b1~b4 may be training sequences in the first embodiment, the main purpose of which is to estimate channel conditions of signal transmissions in a way predefined in the communication apparatus 11 and the communication system 13. Because the training sequences are well known to those skilled in the art, no further description will be made herein.

Figure 1E:
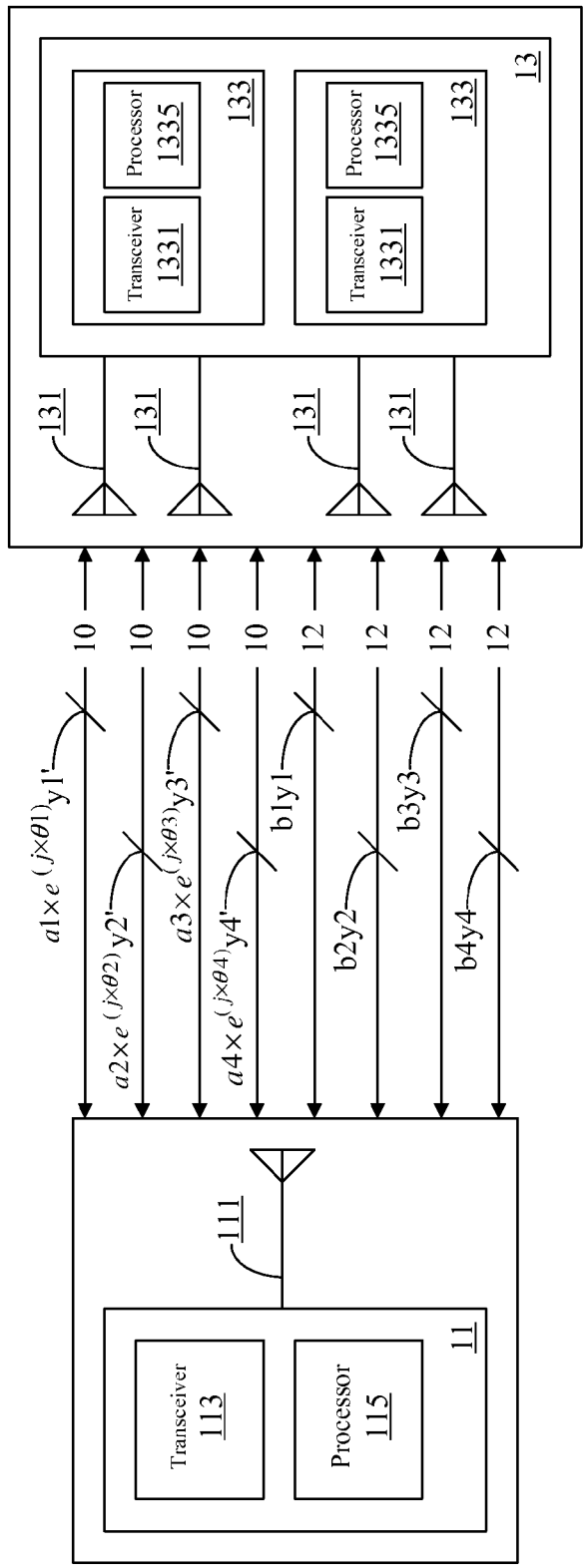
FIG. 1E is a schematic view illustrating sounding channels between the communication apparatus and the communication system according to the first embodiment of the present invention.

Referring to FIG. 1E, there is shown a schematic view illustrating sounding channels between the communication apparatus 11 and the communication system 13 according to the first embodiment of the present invention. After obtaining the phases θ1~θ4, the processor 115 of the communication apparatus 115 appends the phases θ1~θ4 in an exponential form (i.e., $e^{(j\times\theta 1)}$, $e^{(j\times\theta 2)}$, $e^{(j\times\theta 3)}$ and $e^{(j\times\theta 4)}$) of the representations to the first sounding signals a1~a4 (i.e., $a1\times e^{(j\times\theta 1)}$, $a2\times e^{(j\times\theta 2)}$, $a3\times e^{(j\times\theta 3)}$ and $a4\times e^{(j\times\theta 4)}$) respectively, and then transmits the first sounding signals $a1\times e^{(j\times\theta 1)}$, $a2\times e^{(j\times\theta 2)}$, $a3\times e^{(j\times\theta 3)}$ and $a4\times e^{(j\times\theta 4)}$ with the phase information from the transceiver 113 to the communication system 13 via a plurality of sounding channels 10. In other words, the transceiver 1331 of the communication device 133 of the communication system 13 then receives the first sounding signals $a1\times e^{(j\times\theta 1)}$, $a2\times e^{(j\times\theta 2)}$, $a3\times e^{(j\times\theta 3)}$ and $a4\times e^{(j\times\theta 4)}$ with the phase information via the first sounding channels 10.

On the other hand, the communication apparatus 11 transmits the second sounding signals b1~b4 directly from the transceiver 113 to the communication system 13 via a plurality of second sounding signals 12. In other words, the transceiver 1331 of the communication device 133 of the communication system 13 receives the second sounding signals b1~b4 via the second sounding channels 12. It shall be particularly appreciated that, because channel responses will be generated due to the channel characteristics when the communication apparatus 11 transmits the first sounding signals $a1\times e^{(j\times\theta1)}$, $a2\times e^{(j\times\theta2)}$, $a3\times e^{(j\times\theta3)}$ and $a4\times e^{(j\times\theta4)}$ with the phase information and the second sounding signals b1~b4 from the transceiver 113 to the communication system 13 via the first sounding channels 10 and the second sounding channels 12 respectively, the first sounding signals $a1\times e^{(j\times\theta1)}$, $a2\times e^{(j\times\theta2)}$, $a3\times e^{(j\times\theta3)}$ and $a4\times e^{(j\times\theta4)}$ with the phase information and the second sounding signals b1~b4 received by the communication device 133 of the communication system 13 have the channel responses incorporated therein.

Because the second sounding signals b1~b4 are signals predefined in the communication system 13, the communication device 133 of the communication system 13 can utilize the processor 1335 to estimate the second channel responses y1~y4 respectively. In detail, after the second sounding signals b1~b4 are transmitted to the communication system 13 via the second sounding channels 12, the communication system 13 receives the sounding signals in the form of b1y1, b2y2, b3y3 and b4y4. Then, the second channel responses y1~y4 can be derived by the communication system 13 because the second sounding signals b1~b4 are predefined in the communication system 13.

Next, because the first sounding channels 10 and the second sounding channels 12 of the present invention are highly correlated (i.e., the first sounding channels 10 and the second sounding channels 12 are channels adjacent to each other in time or in frequency or having similar properties), the channel responses thereof may actually be considered to be the same. This means that channel responses generated when signals are transmitted in the first sounding channels 10 are equal to channel responses generated when the signals are transmitted in the second sounding channels 12.

Therefore, the first sounding signals $a1\times e^{(j\times\theta1)}$, $a2\times e^{(j\times\theta2)}$, $a3\times e^{(j\times\theta3)}$ and $a4\times e^{(j\times\theta4)}$ transmitted to the communication system 13 via the first sounding channels 10 are received by the communication system 13 in the form of $a1\times e^{(j\times\theta1)}$ y1', $a2\times e^{(j\times\theta2)}$ y2', $a3\times e^{(j\times\theta3)}$ y3' and $a4\times e^{(j\times\theta4)}$ y4'. Here, y1'~y4' represent the channel responses of the first sounding channels 10. Because the second channel responses y1~y4 are substantially equal to the channel responses y1'~y4' and the first sounding signals a1~a4 are signals predefined in the communication system 13, the processor 1335 of the communication device 133 can calculate $e^{(j\times\theta1)}$, $e^{(j\times\theta2)}$, $e^{(j\times\theta3)}$ and $e^{(j\times\theta4)}$ according to the first sounding signals a1~a4 and the second channel responses y1~y4 and further derive the phases θ1~θ4.

Alternatively, in other embodiments where correlations between the first sounding channels and the second sounding channels are known in advance (i.e., a correlation matrix between y1~y4 and y1'~y4' or between y1~y4 and $y1'e^{(j\times\theta1)}$, $y2'e^{(j\times\theta2)}$, $y3'e^{(j\times\theta3)}$ and $y4'e^{(j\times\theta4)}$ are know in advance by the communication systems 13), $e^{(j\times\theta1)}$, $e^{(j\times\theta2)}$, $e^{(j\times\theta3)}$ and $e^{(j\times\theta4)}$ may be derived according to conventional technologies based on the Winner filter. It shall be particularly appreciated that, this is another conventional way to derive $e^{(j\times\theta1)}$, $e^{(j\times\theta2)}$, $e^{(j\times\theta3)}$ and $e^{(j\times\theta4)}$, and will not be further described herein.

Then, after knowing the phase information of the channels between the communication system 13 and the communication apparatus 11, the communication system 13 can transmit signals to the communication apparatus 11 in a more efficient way. In more detail, the processor 1335 of the communication device 133 performs phase compensation on a transmission signal (not shown) before the transmission signal is transmitted by the communication device 133 of the communication system 13. Taking the first embodiment as an example, phase compensation is performed on the transmission signal according to the phases θ1~θ4. Then, it will be unnecessary to perform additional phase processing on the transmission signal after it is transmitted by the transceiver 1331 to the communication apparatus 11 (i.e., after the compensated transmission signal is received by the transceiver 113 of the communication apparatus 11 from the communication system 13), which makes transmission of the signal more efficient.

For example, if it is desired to transmit a signal H to the communication apparatus 11 via the four second antennae 131, the communication system 13 can firstly perform phase compensation on the signal H according to the phases θ1~θ4; i.e., the communication system 13 transmits the signal H in the form of $H\times e^{(-j\times\theta1)}$, $H\times e^{(-j\times\theta2)}$, $H\times e^{(-j\times\theta3)}$ and $H\times e^{(-j\times\theta4)}$ to the communication apparatus 11 via the four second antennae 131 respectively. Thus, it will be unnecessary for the communication apparatus 11 to perform additional phase processing on the signal H.

Figure 2A:
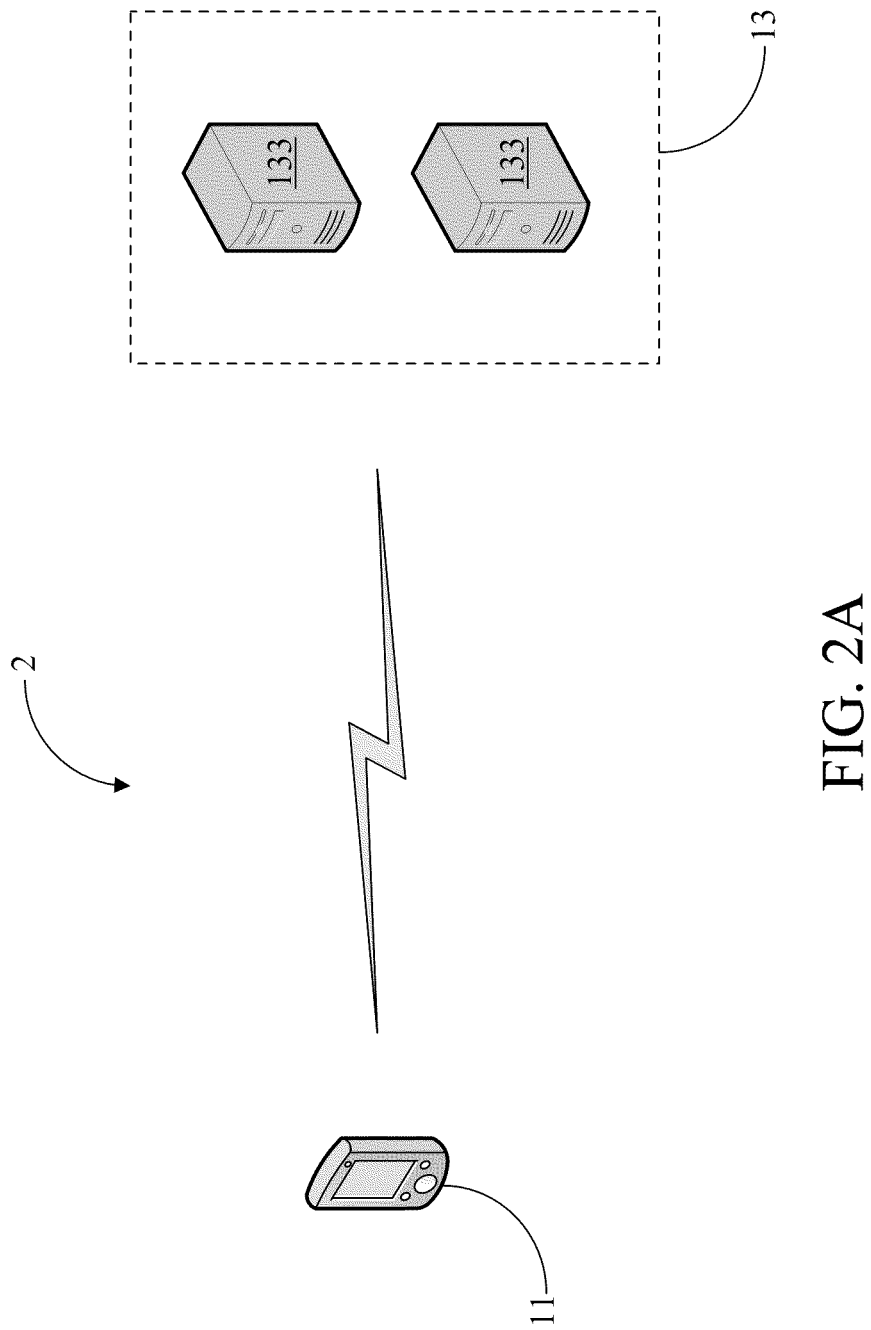
FIG. 2A is a schematic view of an MIMO network according to a second embodiment of the present invention.
Figure 2B:
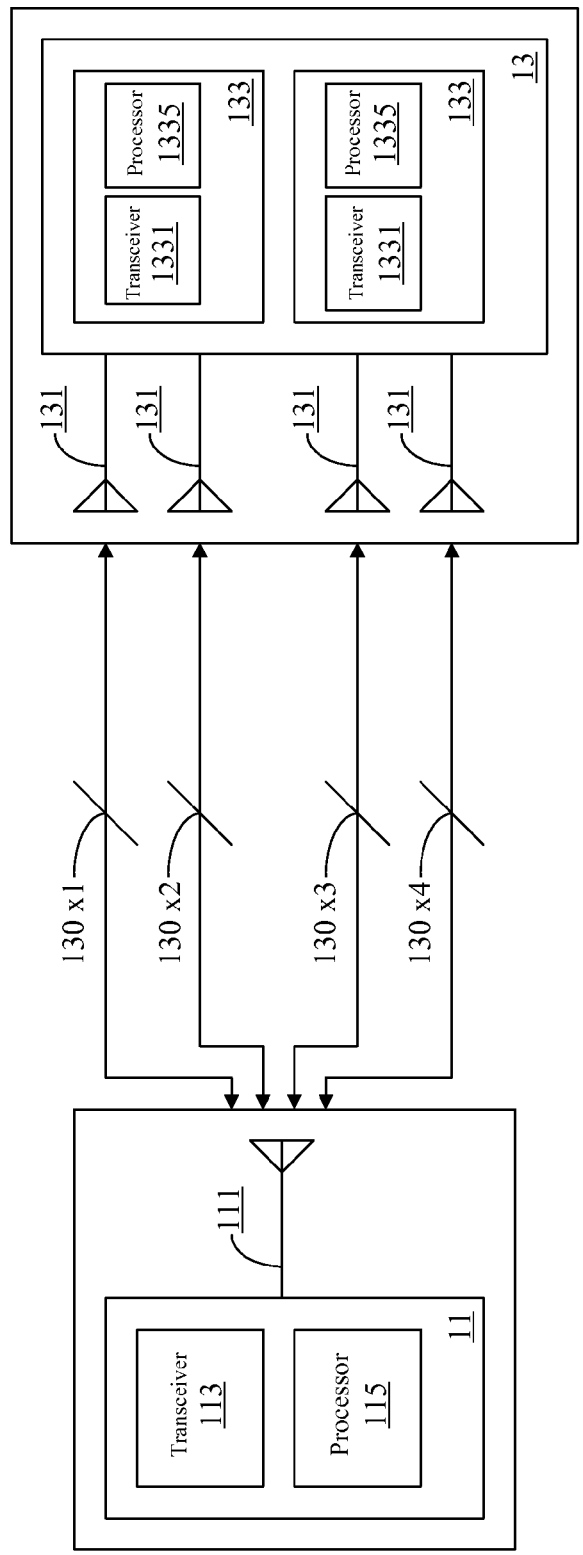
FIG. 2B is a schematic view illustrating signal transmissions between a communication apparatus and a communication system according to a second embodiment of the present invention.

Referring to FIG. 2A to FIG. 2B, FIG. 2A is a schematic view of an MIMO network 2 according to a second embodiment of the present invention, and FIG. 2B is a schematic view illustrating signal transmissions between the communication apparatus 11 and the communication system 13 according to a second embodiment of the present invention. Elements of the second embodiment are just the same as those of the first embodiments, so functions thereof will not be further described herein. It shall be particularly emphasized that, the second embodiment differs from the first embodiment in the number of the sounding signals and the number of the sounding channels; to be more specific, the numbers of the first sounding signals, the second sounding signals, the first sounding channels and the second sounding channels are all equal to the number of the second antennae less one in the second embodiment.

Specifically, because the number of the second antennae 131 is four in the second embodiment, the numbers of the first sounding signals, the second sounding signals, the first sounding channels and the second sounding channels are all equal to three; correspondingly, correct phase information of the spatial channels can be obtained by the communication system 13 via the first sounding channels 10 and the second sounding channels 12 by means of the first sounding signals a1~a3 and the second sounding signals b1~b3 predefined in the communication apparatus 11 and the communication system 13. It shall be particularly appreciated that, the first sounding signals a1~a3 and the second sounding signals b1~b3 may also be training sequences in the second embodiment; the training sequences are well known to those skilled in the art, so they will not be further described herein.

Figure 2C:
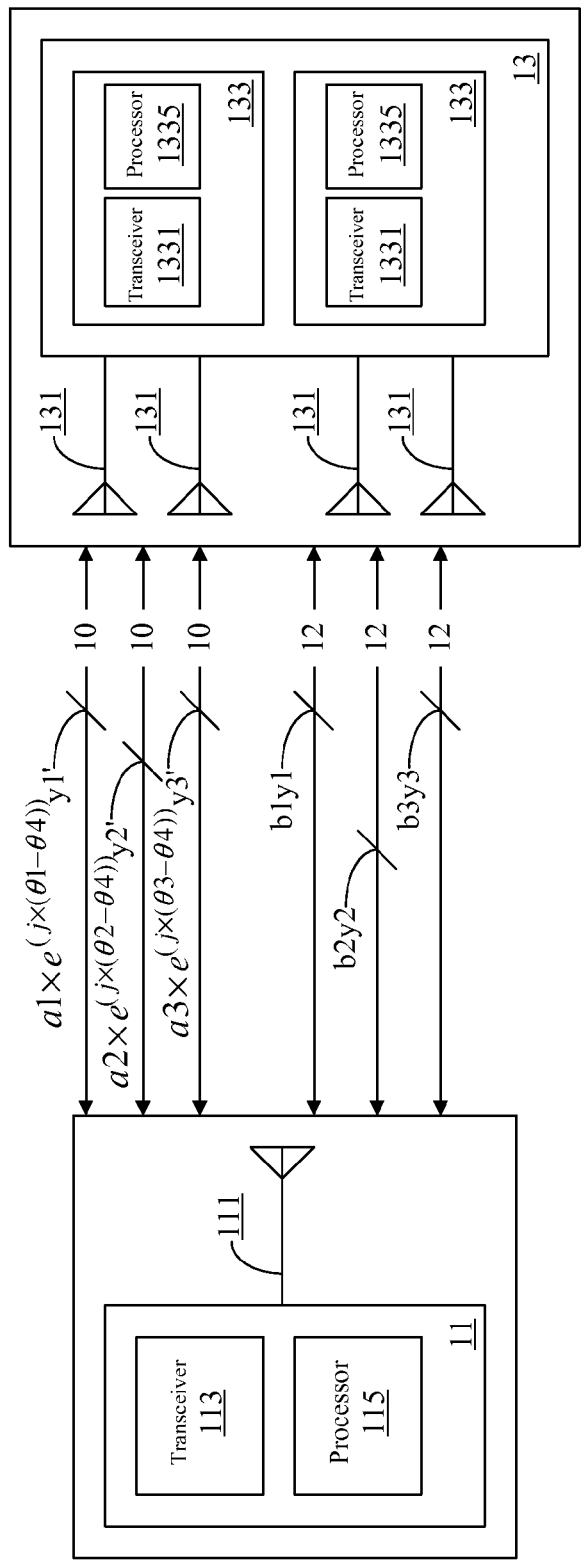
FIG. 2C is a schematic view illustrating sounding channels between the communication apparatus and the communication system according to the second embodiment of the present invention.

Referring to FIG. 2C, there is shown a schematic view illustrating sounding channels between the communication apparatus 11 and the communication system 13 according to the second embodiment of the present invention. After obtaining the phases θ1~θ4, the processor 115 of the communication apparatus 11 divides the phases into a standard phase θ4 and basic phases θ1~θ3, adjusts the basic phases θ1~θ03 into θ1-θ4, θ2-θ4 and θ3-θ4 according to the standard phase θ4, and appends the adjusted basic phases in the exponential form to the first sounding signals a1~a3 respectively (i.e., $a1\times e^{(j\times\theta1-\theta4)}$, $a2\times e^{(j\times\theta2-\theta4)}$ and $a3\times e^{(j\times\theta3-\theta4)}$). Then, the communication apparatus 11 transmits the first sounding signals $a1\times e^{(j\times\theta1-\theta4)}$, $a2\times e^{(j\times\theta2-\theta4)}$ and $a3\times e^{(j\times\theta3-\theta4)}$ with the phase information from the transceiver 113 to the communication system 13 via a plurality of first sounding channels 10. In other words, the transceiver 1331 of the communication device 133 of the communication system 13 receives the first sounding signals $a1\times e^{(j\times\theta1-\theta4)}$, $a2\times e^{(j\times\theta2-\theta4)}$ and $a3\times e^{(j\times\theta3-\theta4)}$ with the phase information via the first sounding channels 10.

On the other hand, the communication apparatus 11 transmits the second sounding signals b1~b3 from the transceiver 113 to the communication system 13 directly via the second sounding channels 12; in other words, the transceiver 1331 of the communication device 133 of the communication system 13 receives the second sounding signals b1~b3 via the second sounding channels 12. Likewise, because channel responses will be generated due to the channel characteristics when the communication apparatus 11 transmits the first sounding signals $a1 \times e^{(j \times \theta 1 - \theta 4)}$, $a2 \times e^{(j \times \theta 2 - \theta 4)}$ and $a3 \times e^{(j \times \theta 3 - \theta 4)}$ with the phase information and the second sounding signals b1~b3 from the transceiver 113 to the communication system 13 via the first sounding channels 10 and the second sounding channels 12 respectively, the first sounding signals $a1 \times e^{(j \times \theta 1 - \theta 4)}$, $a2 \times e^{(j \times \theta 2 - \theta 4)}$ and $a3 \times e^{(j \times \theta 3 - \theta 4)}$ with the phase information and the second sounding signals b1—b3 received by the communication device 133 of the communication system 13 have the channel responses incorporated therein.

Because the second sounding signals b1~b3 are signals predefined in the communication system 13, the communication device 133 of the communication system 13 can utilize the processor 1335 to estimate the second channel responses y1~y3 respectively. In detail, after the second sounding signals b1~b3 are transmitted to the communication system 13 via the second sounding channels 12, the communication system 13 receives the sounding signals in the form of b1y1, b2y2 and b3y3. Then, the second channel responses y1~y3 can be derived by the communication system 13 because the second sounding signals θ1~θ3 are predefined in the communication system 13.

Next, because the first sounding channels 10 and the second sounding channels 12 of the present invention are highly correlated (i.e., the first sounding channels 10 and the second sounding channels 12 are adjacent to each other in time or in frequency or having similar properties), the channel responses thereof may actually be considered to be the same. This means that channel responses generated when signals are transmitted in the first sounding channels 10 are equal to channel responses generated when the signals are transmitted in the second sounding channels 12.

Therefore, the first sounding signals $a1 \times e^{(j \times \theta - \theta 4)}$, $a2 \times e^{(j \times \theta 2 - \theta 4)}$ and $a3 \times e^{(j \times \theta 3 - \theta 4)}$ transmitted to the communication system 13 via the first sounding channels 10 are received by the communication system 13 in the form of $a1 \times e^{(j \times \theta - \theta 4)}$ y1', $a2 \times e^{(j \times \theta 2 - \theta 4)}$ y2', and $a3 \times e^{(j \times \theta 3 - \theta 4)}$ y3'. Here, y1'~y3' correspond to the channel responses of the first sounding channels 10. Because the second channel responses y1~y3 are substantially equal to the channel responses y1'~y3' and the first sounding signals a1~a3 are predefined in the communication system 13, the processor 1335 of the communication device 133 can calculate $e^{(j \times \theta 1 - \theta 4)}$, $e^{(j \times \theta 2 - \theta 4)}$, $e^{(j \times \theta 3 - \theta 4)}$ according to the first sounding signals a1~a4 and the second channel responses y1~y3 that are already known and further derive the phases θ1-θ4, θ2-θ4 and θ3-θ4 therefrom.

Similarly, in other embodiments where correlations between the first sounding channels and the second sounding channels are known in advance (i.e., a correlation matrix between y1~y3 and y1'~y3' or between y1~y3 and y1' $e^{(j \times \theta 1 - \theta 4)}$, y2' $e^{(j \times \theta 2 - \theta 4)}$ and y3' $e^{(j \times \theta 3 - \theta 4)}$ are known in advance by the communication system 13), $e^{(j \times \theta 1 - \theta 4)}$, $e^{(j \times \theta 2 - \theta 4)}$, and $e^{(j \times \theta 3 - \theta 4)}$ may be derived according to conventional technologies based on the Winner filter.

Then, after knowing the phase information of the channels between the communication system 13 and the communication apparatus 11, the communication system 13 can transmit signals to the communication apparatus 11 in a more efficient way. In more detail, the processor of the communication device 133 performs phase compensation on a transmission signal (not shown) before the transmission signal is transmitted by the communication device 133 of the communication system 13. In the second embodiment, the transmission signal is compensated by the phases θ1-θ4, θ2-θ4 and θ3-θ4. Then, after the compensated transmission signal is transmitted by the transceiver 1331 to the communication apparatus 11 (i.e., after the compensated transmission signal is received, with the standard phase θ4 as a reference, by the transceiver 113 of the communication apparatus 11 from the communication system 13), additional phase processing can be performed on the transmission signal according to the standard phase θ4.

Also for example, if it is desired to transmit a signal G to the communication apparatus 11 via the four second antennae 131, the communication system 13 can firstly perform compensation on the signal G according to the phases θ1-θ4, θ2-θ4 and θ3-θ4, i.e., divide the signal G into $G \times e^{(-j \times \theta 1 - \theta 4)}$, $G \times e^{(-j \times \theta 2 - \theta 4)}$, $G \times e^{(-j \times \theta 3 - \theta r)}$ and G for transmission to the communication apparatus 11 via the four second antennae 131 respectively. Thus, the signal G can be received by the communication apparatus 11 with the standard phase θ4 as a reference. Here, although a phase difference, such as the standard phase θ4, is generated by the signal G at the side of the communication apparatus 11, it can be compensated easily by conventional channel estimation technologies.

In the second embodiment, setting the numbers of the first sounding signals, the second sounding signals, the first sounding channels and the second sounding channels to all be equal to the number of the second antennae less one can advantageously reduce the number of the sounding channels. In this way, the utilization rate of the network resources can be reduced by reducing use of channel frequency bands.

It shall be further appreciated that, although the first embodiment and the second embodiment are described with reference to a single first antenna, those skilled in the art may also readily apply the present invention to applications having a plurality of first antennae according to the concepts disclosed above. For example, assume that the communication apparatus has M first antennae, the communication system has N second antennae, and M×N first sounding signals and M×N second sounding signals are defined between the communication apparatus and the communication system in an MIMO network.

Similar to the operations of the first embodiment, the communication apparatus estimates M×N first channel responses and calculates M×N corresponding phases accordingly. Thus, the communication apparatus can append the M×N phases to the M×N first sounding signals respectively and transmit the M×N first sounding signals with the phase information to the communication system via the M×N first sounding channels. Then, the communication apparatus transmits the M×N second sounding signals to the communication system via M×N second sounding channels so that the communication system can determine M×N corresponding second channel responses according to the M×N second sounding signals. Finally, the communication system can calculate the M×N phases according to the M×N first sounding signals and the M×N second channel responses. Accordingly, the same concepts may also be applied to the environment described in the second embodiment, so no further description will be made herein.

Figure 3:
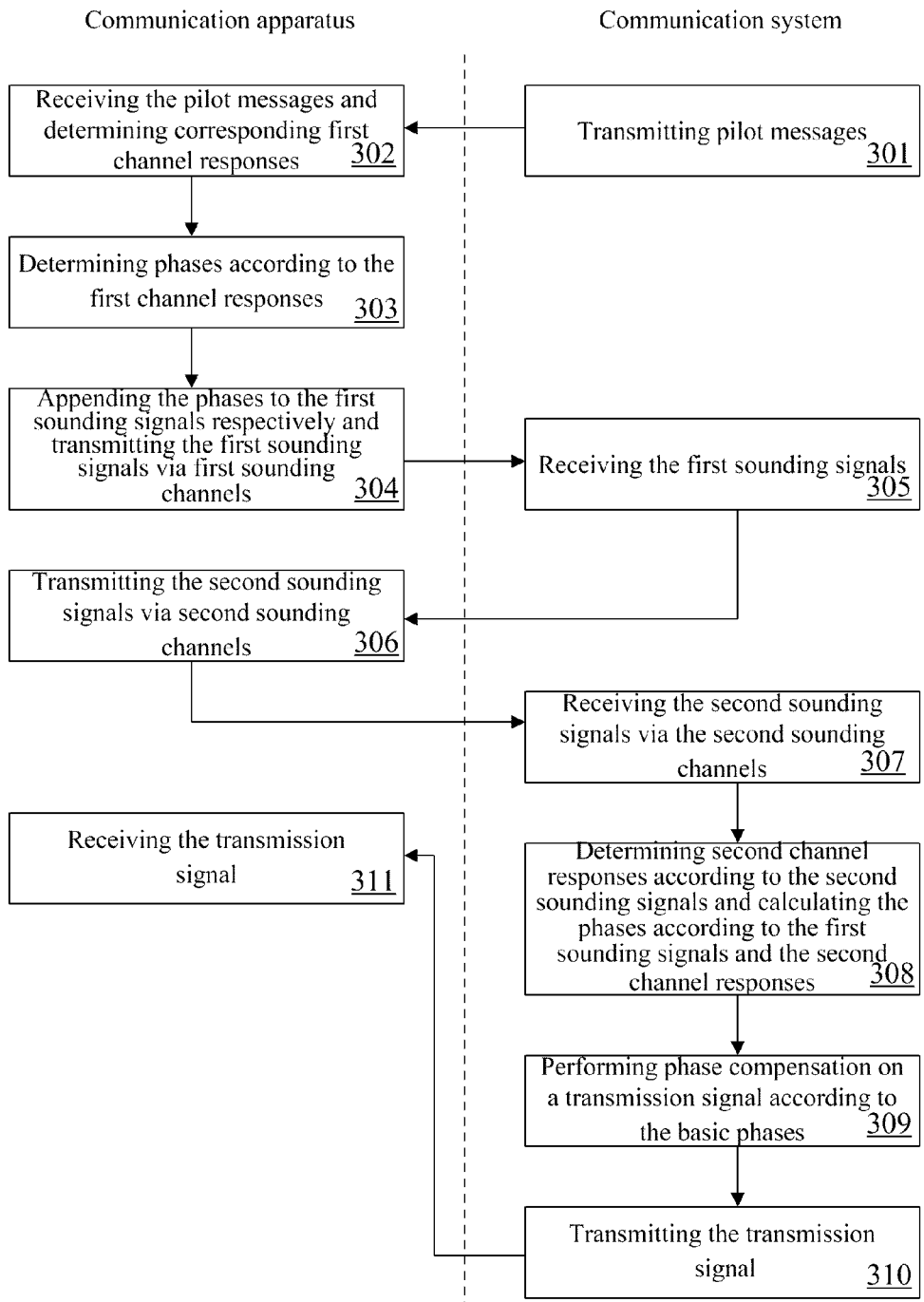
FIG. 3 is a flowchart of a channel feedback method according to a third embodiment of the present invention.

A third embodiment of the present invention is a channel feedback method, a flowchart of which is shown in FIG. 3. The channel feedback method of the third embodiment is for use in a communication apparatus and a communication system (e.g., the communication apparatus 11 and the communication system 13 of the first embodiment). The communication apparatus and the communication system are used in an MIMO network. The communication apparatus has a first antenna, and the communication system has a plurality of second antennae. The communication apparatus and the communication system communicate via the first antenna and the second antennae respectively. A plurality of first sounding signals and a plurality of second sounding signals are defined between the communication apparatus and the communication system. Likewise, the first sounding signals and the second sounding signals may be training sequences in the third embodiment. Steps of the channel feedback method of the third embodiment are detailed as follows.

First, step 301 is executed to enable the communication system to transmit a plurality of pilot messages to the communication apparatus. Then, step 302 is executed to enable the communication apparatus to receive the pilot messages transmitted by the communication system and determine a plurality of corresponding first channel responses according to the pilot messages. In other words, the communication apparatus can determine the first channel responses of spatial channels between the communication apparatus and the communication system according to the pilot messages.

Next, step 303 is executed to enable the communication apparatus to determine a plurality of corresponding phases according to the channel responses. Then, by use of the first sounding signals and the second sounding signals, correct phase information can be obtained by the communication system via the two sets of sounding channels. In detail, step 304 is executed to enable the communication apparatus to append the phases to the first sounding signals respectively and transmit the first sounding signals to the communication system via a plurality of first sounding channels, and step 305 is executed to enable the communication system to receive the first sounding signals with the phase information from the communication apparatus.

Thereafter, step 306 is executed to enable the communication apparatus to transmit the second sounding signals to the communication system via a plurality of second sounding channels. Step 307 is executed to enable the communication system to receive the second sounding signals from the communication apparatus via the second sounding channels. Because channel responses are generated during transmission of the signals in the channels, the first sounding signals and the second sounding signals with the phase information have channel responses incorporated therein when being received by the communication system. Afterwards, step 308 is executed to enable the communication system to determine a plurality of corresponding second channel responses according to the second sounding signals and calculate the phases according to the first sounding signals and the second channel responses.

Specifically, because the second sounding signals are already known by the communication system, the communication system can further determine the second channel responses according to the second sounding signals transmitted by the communication apparatus via the second sounding channels. Further, because the second sounding channels and the first sounding channels are highly correlated, the channel responses thereof may be considered to be the same. Accordingly, the communication system can use the second channel responses and the known first sounding signals to calculate the phases according to the first sounding signals with the phase information transmitted via the first sounding channels.

Likewise, after knowing the phase information of the channels between the communication system and the communication apparatus, the communication system can transmit signals to the communication apparatus in a more efficient way. Then, step 309 is executed to enable the communication system to perform phase compensation on a transmission signal according to the basic phases. Step 310 is executed to enable the communication system to transmit the transmission signal to the communication apparatus, and step 311 is executed to enable the communication apparatus to receive the transmission signal from the communication system. By performing phase compensation in advance, it becomes unnecessary for the communication apparatus to perform additional phase processing on the transmission signal after receiving the compensated transmission signal from the communication system, which makes the signal transmission more efficient.

Figure 4:
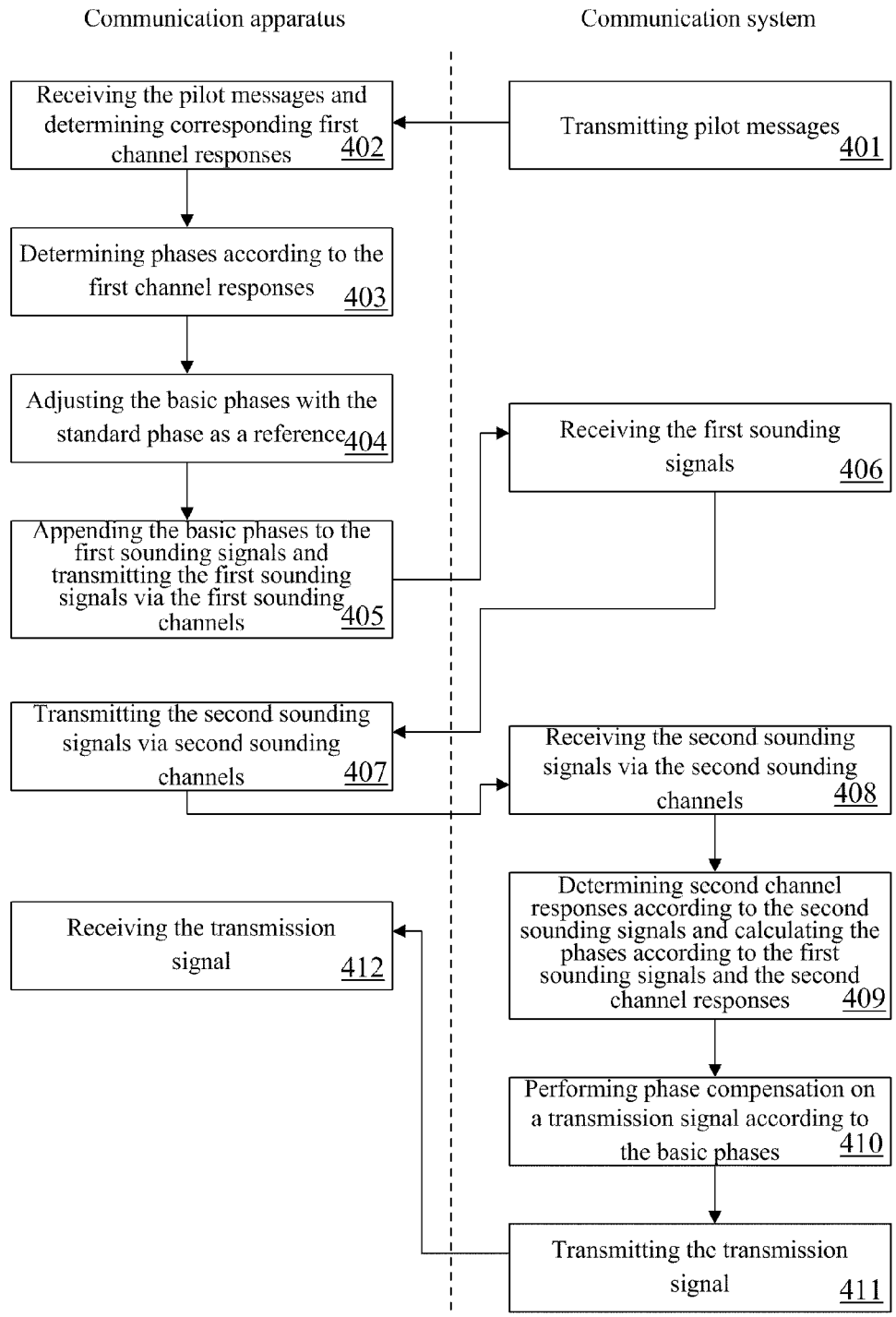
FIG. 4 is a flowchart of a channel feedback method according to a fourth embodiment of the present invention.

A fourth embodiment of the present invention is a channel feedback method, a flowchart of which is shown in FIG. 4. The channel feedback method of the fourth embodiment is for use in a communication apparatus and a communication system (e.g., the communication apparatus 11 and the communication system 13 of the previous embodiments). The communication apparatus and the communication system are used in an MIMO network. The communication apparatus has a first antenna, and the communication system has a plurality of second antennae. The communication apparatus and the communication system communicate via the first antenna and the second antennae respectively. A plurality of first sounding signals and a plurality of second sounding signals are defined between the communication apparatus and the communication system.

Likewise, the first sounding signals and the second sounding signals of the fourth embodiment may also be training sequences, which will not be further described herein. The fourth embodiment differs from the third embodiment in the number of the sounding signals and the number of the sounding channels; in other words, the numbers of the first sounding signals, the second sounding signals, the first sounding channels and the second sounding channels are all equal to the number of the second antennae less one in the fourth embodiment. Steps of the channel feedback method of the fourth embodiment are detailed as follows.

First, step 401 is executed to enable the communication system to transmit a plurality of pilot messages to the communication apparatus. Then, step 402 is executed to enable the communication apparatus to receive the pilot messages transmitted by the communication system and determine a plurality of corresponding first channel responses according to the pilot messages. In other words, the communication apparatus can determine the first channel responses of spatial channels between the communication apparatus and the communication system according to the pilot messages.

Then, step 403 is executed to enable the communication apparatus to determine a plurality of corresponding phases according to the channel responses. The phases include a standard phase and a plurality of basic phases. Then, by use of the first sounding signals and the second sounding signals, correct phase information can be obtained by the communication system via the two sets of sounding channels. Step 404 is executed to enable the communication apparatus to adjust the basic phases with the standard phase as a reference. Afterwards, step 405 is executed to enable the communication apparatus to append the basic phases to the first sounding signals respectively and transmit the first sounding signals to the communication system via the first sounding channels. Step 406 is executed to enable the communication system to receive the first sounding signals with the phase information from the communication apparatus.

Thereafter, step 407 is executed to enable the communication apparatus to transmit the second sounding signals to the communication system via a plurality of second sounding channels, and step 408 is executed to enable the communication system to receive the second sounding signals from the communication apparatus via the second sounding channels. Because channel responses are generated during transmission of the signals in the channels, the first sounding signals and the second sounding signals with the phase information have channel responses incorporated therein when being received by the communication system. Afterwards, step 409 is executed to enable the communication system to determine a plurality of corresponding second channel responses according to the second sounding signals and calculate the phases according to the first sounding signals and the second channel responses.

Likewise, because the second sounding signals are already known, the communication system can further determine the second channel responses according to the second sounding signals transmitted by the communication apparatus via the second sounding channels. Further, because the second sounding channels and the first sounding channels are highly correlated, the channel responses thereof may be considered to be the same. Accordingly, the communication system can use the second channel responses and the known first sounding signals to calculate the phases according to the first sounding signals with the phase information transmitted via the first sounding channels.

Likewise, after knowing the phase information of the channels between the communication system and the communication apparatus, the communication system can transmit signals to the communication apparatus in a more efficient way. Then, step 410 is executed to enable the communication system to perform phase compensation on a transmission signal according to the basic phases. Step 411 is executed to enable the communication system to transmit the transmission signal to the communication apparatus, and step 412 is executed to enable the communication apparatus to receive the transmission signal from the communication system. Similarly, the communication apparatus can receive the signal with the standard phase as a reference in the aforesaid way. Here, although a phase difference, such as the standard phase, is generated by the signal at the side of the communication apparatus, it can be compensated easily by conventional channel estimation technologies.

Likewise, in the fourth embodiment, setting the numbers of the first sounding signals, the second sounding signals, the first sounding channels and the second sounding channels to all be equal to the number of the second antennae less one can advantageously reduce the number of the sounding channels. In this way, the utilization rate of the network resources can be reduced by reducing use of channel frequency bands.

According to the above descriptions, the communication apparatus, the communication system and the channel feedback method thereof of the present invention can determine phase information by using two sets of sounding channels in the MIMO network and further use the phase information to improve the efficiency of the channel feedback. Thereby, the shortcomings of the prior art can be easily overcome to make the channel feedback more efficient.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A channel feedback method for use in a communication apparatus, wherein the communication apparatus is used in a multi-input multi-output (MIMO) network comprising at least one communication system, the communication apparatus has a first antenna, the communication system has a plurality of second antennae, the communication apparatus and the communication system communicate via the first antenna and the second antennae respectively, and a plurality of first sounding signals and a plurality of second sounding signals are defined between the communication apparatus and the communication system, the channel feedback method comprising the steps of:

(a) enabling the communication apparatus to receive a plurality of pilot messages from the communication system and determine a plurality of corresponding first channel responses according to the pilot messages;

(b) enabling the communication apparatus to determine a plurality of corresponding phases according to the first channel responses;

(c) enabling the communication apparatus to append the phases to the first sounding signals respectively and transmit the first sounding signals to the communication system via the first sounding channels; and (d) enabling the communication apparatus to transmit the second sounding signals to the communication system via a plurality of second sounding channels so that the communication system determines a plurality of corresponding second channel responses according to the second sounding signals and calculates the phases according to the first sounding signals and the second channel responses.

2. The channel feedback method as claimed in claim 1, further comprising the following step after the step (d):

(e) enabling the communication apparatus to receive a transmission signal from the communication system after the communication system has performed phase compensation on the transmission signal according to the phases.

3. The channel feedback method as claimed in claim 1, wherein the phases include a standard phase and a plurality of basic phases, number of the first sounding signals, the second sounding signals, the first sounding channels and the second sounding channels are all equal to number of the second antennae less one, and the step (c) further comprises the steps of:

(c1) enabling the communication apparatus to adjust the basic phases with the standard phase as a reference; and (c2) enabling the communication apparatus to append the basic phases to the first sounding signals respectively and transmit the first sounding signals to the communication system via the first sounding channels.

4. The channel feedback method as claimed in claim 3, further comprising the following step after the step (d):

(e) enabling the communication apparatus to receive a transmission signal from the communication system with the standard phase as a reference after the communication system has performed phase compensation on the transmission signal according to the basic phases.

5. The channel feedback method as claimed in claim 1, wherein the first sounding signals and the second sounding signals are training sequences.

6. A channel feedback method for use in a communication system and in a MIMO network comprising a communication apparatus, wherein the communication apparatus has a first antenna, the communication system has a plurality of second antennae, the communication apparatus and the communication system communicate via the first antenna and the second antennae respectively, and a plurality of first sounding signals and a plurality of second sounding signals are defined between the communication apparatus and the communication system, the channel feedback method comprising the steps of:

(a) enabling the communication system to transmit a plurality of pilot messages to the communication apparatus so that the communication apparatus determines a plurality of corresponding first channel responses according to the pilot messages and determines a plurality of corresponding phases according to the first channel responses;

(b) enabling the communication system to receive the first sounding signals from the communication apparatus via a plurality of first sounding channels after the communication apparatus has appended the phases to the first sounding signals respectively;

(c) enabling the communication system to receive the second sounding signals from the communication apparatus via a plurality of second sounding channels; and (d) enabling the communication system to determine a plurality of corresponding second channel responses according to the second sounding signals and calculate the phases according to the first sounding signals and the second channel responses.

7. The channel feedback method as claimed in claim 6, further comprising the following steps after the step (d):

(e) enabling the communication system to perform phase compensation on a transmission signal according to the phases; and (f) enabling the communication system to transmit the transmission signal to the communication apparatus after the step (e).

8. The channel feedback method as claimed in claim 6, wherein the phases include a standard phase and a plurality of basic phases, number of the first sounding signals, the second sounding signals, the first sounding channels and the second sounding channels are all equal to the number of second antennae less one, and the step (b) further comprises the step of:

(b1) enabling the communication system to receive the first sounding signals from the communication apparatus via the first sounding channels after the communication apparatus has adjusted the basic phases with the standard phase as a reference and has appended the basic phases to the first sounding signals respectively.

9. The channel feedback method as claimed in claim 8, further comprising the following steps after the step (d):

(e) enabling the communication system to perform phase compensation on a transmission signal according to the basic phases;

(f) enable the communication system to transmit the transmission signal to the communication apparatus after the step (e) so that the communication apparatus receives the transmission signal with the standard phase as a reference.

10. The channel feedback method as claimed in claim 6, wherein the first sounding signals and the second sounding signals are training sequences.

11. A communication apparatus for use in a multi-input multi-output (MIMO) network comprising a communication system, wherein a plurality of first sounding signals and a plurality of second sounding signals are defined between the communication apparatus and the communication system, the communication apparatus comprising:

a first antenna;
a transceiver, being configured to communicate with the communication system via the first antenna and a plurality of second antennae of the communication system; and
a processor,
wherein the transceiver receives a plurality of pilot messages from the communication system, the processor determines a plurality of corresponding first channel responses according to the pilot messages and determines a plurality of corresponding phases according to the first channel responses, and the processor is further configured to: append the phases to the first sounding signals respectively, transmit the first sounding signals from the transceiver to the communication system via a plurality of first sounding channels, and transmit the second sounding signals to the communication system via a plurality of second sounding channels so that the communication system determines a plurality of corresponding second channel responses according to the second sounding signals and calculates the phases according to the first sounding signals and the second channel responses.

12. The communication apparatus as claimed in claim 11, wherein the transceiver is further configured to receive a transmission signal from the communication system after the communication system has performed phase compensation on the transmission signal according to the phases.

13. The communication apparatus as claimed in claim 11, wherein the phases include a standard phase and a plurality of basic phases, number of the first sounding signals, the second sounding signals, the first sounding channels and the second sounding channels are all equal to number of the second antennae less one, the processor is further configured to adjust the basic phases with the standard phase as a reference, and the transceiver is further configured to transmit the first sounding signals to the communication system via the first sounding channels after the processor has appended the basic phases to the first sounding signals respectively.

14. The communication apparatus as claimed in claim 13, wherein the transceiver is configured to receive a transmission signal from the communication system with the standard phase as a reference after the communication system has performed phase compensation on the transmission signal according to the basic phases.

15. The communication apparatus as claimed in claim 11, wherein the first sounding signals and the second sounding signals are training sequences.

16. A communication system for use in a MIMO network, wherein the MIMO network comprises a communication apparatus having a first antenna, and a plurality of first sounding signals and a plurality of second sounding signals are defined between the communication apparatus and the communication system, the communication system comprising:

a plurality of second antennae; and
at least one communication device, comprising:
a transceiver, being configured to communicate with the communication apparatus via the second antennae and the first antenna of the communication apparatus; and
a processor;
wherein the transceiver transmits a plurality of pilot messages to the communication apparatus so that the communication apparatus determines a plurality of corresponding first channel responses according to the pilot messages and determines a plurality of corresponding phases according to the first channel responses, the transceiver is further configured to receive the first sounding signals from the communication apparatus via a plurality of first sounding channels after the communication apparatus has appended the phases to the first sounding signals respectively, and configured to receive the second sounding signals from the communication apparatus via a plurality of second sounding channels, and the processor is configured to determine a plurality of corresponding second channel responses according to the second sounding signals and calculate the phases according to the first sounding signals and the second channel responses.

17. The communication system as claimed in claim 16, wherein the processor is further configured to perform phase compensation on a transmission signal according to the phases, and the transceiver is further configured to transmit the transmission signal to the communication apparatus.

18. The communication system as claimed in claim 16, wherein the phases include a standard phase and a plurality of basic phases, number of the first sounding signals, the second sounding signals, the first sounding channels and the second sounding channels are all equal to number of the second antennae less one, and the transceiver is further configured to receive the first sounding signals from the communication apparatus via the first sounding channels after the communication apparatus has adjusted the basic phases with the standard phase as a reference and has appended the basic phases to the first sounding signals respectively.

19. The communication system as claimed in claim 18, wherein the processor is further configured to perform phase compensation on a transmission signal according to the basic phases, and the transceiver is further configured to transmit the transmission signal to the communication apparatus so that the communication apparatus receives the transmission signal with the standard phase as a reference.

20. The communication system as claimed in claim 16, wherein the first sounding signals and the second sounding signals are training sequences.

\* \* \* \* \*